March 30, 1965  M. MORSE  3,175,454
THREADED SEALING DEVICES HAVING "O"-RING RECESS
OF ASYMETRICAL CONFIGURATION
Filed Nov. 26, 1963

3,175,454
THREADED SEALING DEVICES HAVING O-RING RECESS OF ASYMMETRICAL CONFIGURATION
Milton Morse, 1 Horizon Road, Fort Lee, N.J.
Filed Nov. 26, 1963, Ser. No. 326,032
2 Claims. (Cl. 85—9)

This invention relates generally to the field of threaded sealing devices of a type including a threaded shank having a head thereon having tool engaging means, the head having a recess extending inwardly from an under surface thereof to accommodate a resilient sealing member. More particularly, the invention relates to the provision of a recess of the type described having a cross-sectional configuration particularly suited to cause a minimum of contact with the sealing washer or O-ring until almost fully seated, whereby abrasion and other damage to the washer is maintained at a minimum to permit the device to be reused a number of times.

Devices of this type are well known in the art, and are particularly useful in hermetically sealing openings in metal plates, such as in equipment housings, to protect equipment disposed therein against the deleterious effects of moisture, atmospheric pressure changes and the like. In most cases, the housing is made of sheet metal, and the screw penetrates a relatively small opening thereof to engage a tapped hole or other threaded means disposed on the opposite side of the opening. Upon tightening of the screw, a washer disposed beneath the head is compressed and distorted from its original cross-sectional shape to provide a resilient sealing action between the under surface of the screw head and the outer surface of the penetrated plate. As the screw is turned, the compression of the sealing member or O-ring continues, and is accompanied by a rubbing action from either the outer surface of the plate surrounding the opening, or from the inner surface of the recess into which the O-ring is ultimately disposed, depending upon the particular coefficient of friction existing between the O-ring, and the outer surface of the sheet metal, or the inner surface of the recess in the screw head. While this coefficient of friction can be reduced, in some cases by the use of a suitable lubricant, normal surface irregularities tend to cause an abrasive effect on the outer surface of the resilient sealing member or O-ring, thereby damaging the normally smooth surface thereof. Since the surface irregularities in the recess are caused by the heading operation in which a radial flow of metal occurs, striations in the surface of the recess are of a radial nature, so that in turn during the tightening operation, the abrasive effect upon the corresponding surface of the washer or O-ring is spread over a considerable area, often sufficient to significantly damage the surface.

It is therefore among the principal objects of the present invention to provide a threaded sealing device in which the recess is of a configuration other than that of the normally unstressed O-ring or sealing washer, and in which a major portion of the surface defining the recess remains out of contact with the corresponding part of the O-ring during the initial stages of compression, whereby the abrasive effect on tightening existing between the recess and the O-ring is materially reduced.

Another object of the invention lies in the provision of a threaded sealing device of the class described in which the contour of the recessed head is conveniently manufacturfed by die stamping operations, and without resort to any subsequent machining operations.

A further object of the invention lies in the provision of an improved threaded sealing device possessed of the above advantages, in which the cost of fabrication may be of a reasonably low order, with consequent wide sale, distribution and use.

Yet another object of the invention lies in the provision of an improved threaded sealing device incorporating an O-ring which may be used many times in different installations without damage to the sealing component thereof.

A further object of the invention lies in the provision of an improved sealing device having a recess therein having reserved space or volume for accommodation of portions of a distorted O-ring, the volume of which will vary with the size of clearance hole engaged by the O-ring.

A feature of the invention lies in the fact that the inventive concept may be used with a wide variety of headed sealing fasteners, including rounded head, flat head, fillister head and the like.

Another feature of the invention lies in the provision of a sealing in which the recessed head thereof is so configured as to avoid pinching of the O-ring upon compression.

Another object of the invention lies in the provision of a threaded sealing device of the class described in which the recess in the headed portion thereof is provided with additional reservoir space for accommodating a greater or lesser volume of the flexible sealing gasket depending upon the amount of displaced material forced into the recess upon the tightening of the sealing device upon a clearance hole.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
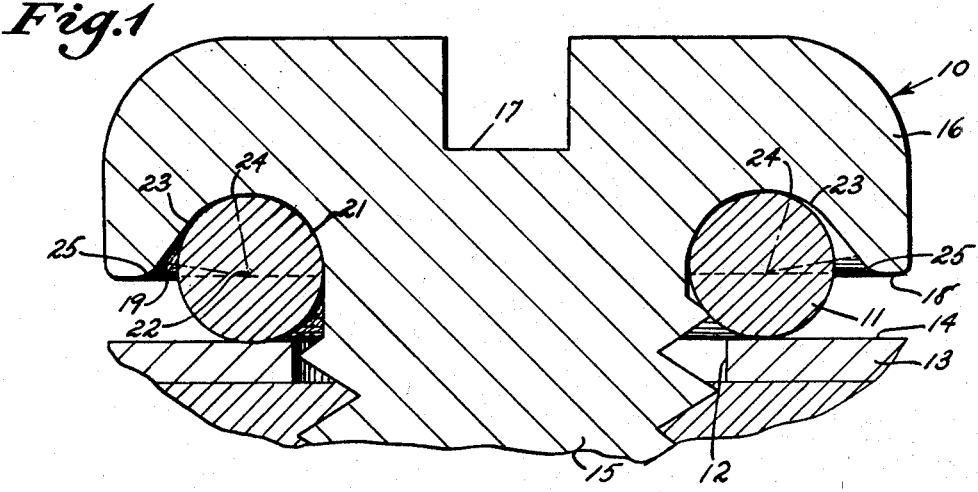
FIGURE 1 is a longitudinal sectional view of an embodiment of the invention prior to installation.

In accordance with the invention, the device, generally indicated by reference character 10 is employed in conjunction with a conventional O-ring 11 formed of any suitable resilient material, such as rubber, synthetic rubber, silicone rubber, and the like. The device 10, as is well known in the art, is employed to seal an opening 12 in a plate 13 or other planar object, having an outer surface 14 which, upon contact, compresses the O-ring 11 to effect a seal above the opening 12.

The device 10 includes a threaded shank 15, and head member 16 having tool engaging means 17. Extending inwardly into the head member 16 from a lower surface 18 is an annular recess 19, of volume preferably equal to the volume of the O-ring 11.

The cross-section of the recess 19 is asymmetrical, and includes at the most inwardly disposed portion a first arcuate surface 21 of substantially constant radius as measured from a center of curvature 22 disposed in the plane of the lower surface of the head member 16. This surface extends over substantially a right angle. Where the device is formed by the usual cold heading die stamping process, I have found it most convenient to form the surface 21 such that it extends over a range of from 90 degrees to 105 degrees.

Continuous with the surface 21 is a second arcuate surface 23 of non-constant radius which progressively increases. Commencing from the points 24 with a radius of curvature equal to that of the first surface 21, the same extends from the center of curvature 22 over an arc of from 70 to 85 degrees. All portions of this surface have a radius of curvature which is substantially greater than the unstressed radius of curvature of the O-ring 11, and during the initial stage of compression, the surface 23 will normally be for the most part, free of contact therewith.

To avoid the possibility of pinching the O-ring when under full compression, the last 5° portion, again as measured from the center of curvature 22, is provided with a small radius having an opposite direction of curvature. Here again, using normal cold heading techniques, this radius may be formed without difficulty by employing a suitable forming tool.

Figure 2:
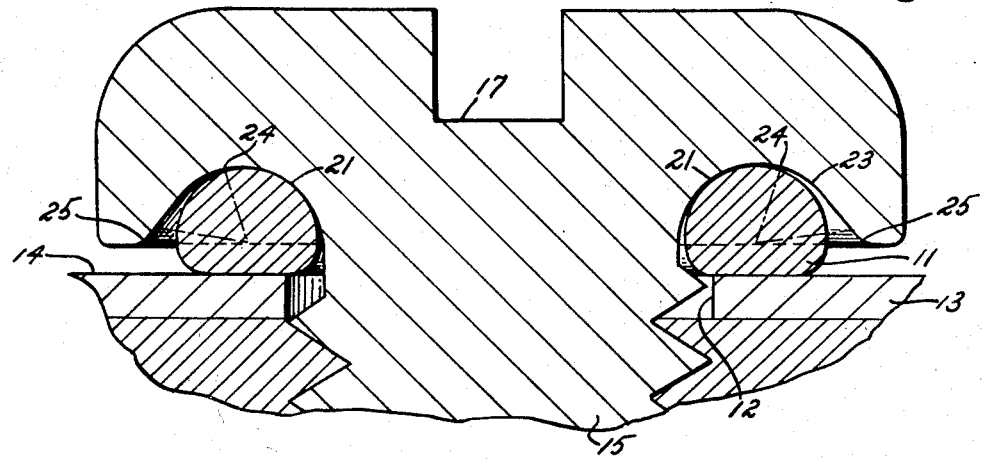
FIGURE 2 is a similar longitudinal sectional view showing a first stage of compression of the O-ring.

Comparing FIGURE 1 with FIGURE 2, it will be observed that during the initial and subsequent stages of compression, the O-ring 11 makes contact with the inner surface of the recess 18 only on the first surface 21. It may be seen that in FIGURE 2, a considerable degree of compression has already been exerted, normally enough to effect a hermetic seal, without engaging the second surface, which only contacts the surface of the O-ring just before the O-ring completely fills the recess. Thus, during the rotation of the device 10, rubbing friction is maintained at a minimum, and the contact of the major portion of the recess with the O-ring occurs only after a relatively small degree of axial rotation of the fastener is necessary to complete the seating of the same.

The above described action is particularly important when it is appreciated that the clearance hole engaged by the sealing device may very often have sharp burrs, or may otherwise present an irregular surface to the lower surface of the O-ring. In the case of a burr, the surface of the O-ring may be easily ripped to effect the quality of seal effected between the O-ring and the surface bordering of the clearance hole. This is avoided in the present invention by preventing full distortion of the O-ring until the threads on the sealing device are almost completely tightened.

Figure 3:
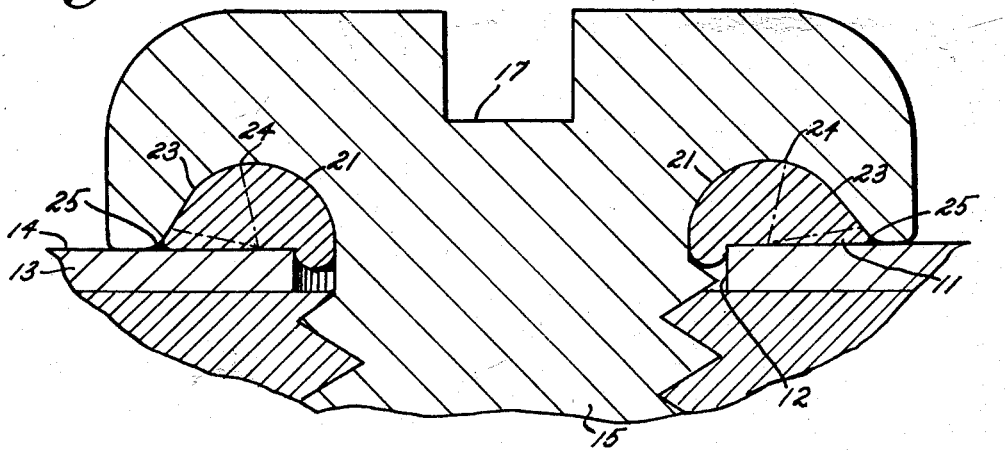
FIGURE 3 is a similar longitudinal sectional view showing the O-ring in fully compressed condition.

With reference to FIGURE 3 in the drawing, it will be observed that a small portion of the volume of the O-ring is forced into the clearance hole 12, the exact amount depending upon the degree of clearance afforded to the threaded shank 15. Where the clearance is relatively small, the excess amount of volume of the O-ring is forced into the interstice formed by the portion 25 and the upper surface 14 of the plate 13.

I wish it to be understood that I do not consider the invention limited to the precise details of structure shown and set forth in this specification, for obvious modifications will occur to those skilled in the art to which the invention pertains.

I claim:
1. In a combination of recessed head threaded sealing device and O-ring washer therefore, in which upon engagement of said sealing device said O-ring is substantially completely disposed within an annually shaped recess, the improvement comprising: said recess being of a cross-sectional shape bounded by a first inwardly disposed arcuate surface of constant radius extending over an arc ranging from 90 to 105 degrees, a second arcuate surface contiguous with said first surface, of gradually increasing radius extending over an arc, as measured from the center of curvature of said first surface, of from 60 to 85 degrees, and a third arcuate surface contiguous with said second arcuate surface, of reversed curvature with respect to said first and second surfaces extending over the remaining 5° of arc as measured from said above mentioned center of curvature, said O-ring having a cross sectional radius of curvature substantially equal to the radius of said first arcuate surface, and a volume at least equal to that of said recess.

2. In a combination of recessed head threaded sealing device and O-ring washer therefore, in which upon engagement of said sealing device said O-ring is substantially completely disposed within an annually shaped recess, the improvement comprising: said recess being of a cross-sectional shape bounded by a first inwardly disposed arcuate surface of constant radius extending over an arc ranging from 90 to 105 degrees, a second arcuate surface contiguous with said first surface, of gradually increasing radius extending over an arc, as measured from the center of curvature of said first surface, of from 60 to 90 degrees, and a third arcuate surface contiguous with said second arcuate surface, of reversed curvature with respect to said first and second surfaces extending over the remaining 5° of arc as measured from said above mentioned center of curvature, said O-ring having a cross sectional radius of curvature substantially equal to the radius of said first arcuate surface, and a volume at least equal to that of said recess.

References Cited by the Examiner
UNITED STATES PATENTS

| | | |
|---|---|---|
| 2,459,668 | 1/49 | Melichar. |
| 2,488,796 | 11/49 | Baier. |
| 2,627,580 | 2/53 | Picard. |
| 2,701,871 | 2/55 | Rauch. |
| 2,752,814 | 7/56 | Iaia. |

EDWARD C. ALLEN, *Primary Examiner.*

M. HENSON WOOD, JR., *Examiner.*